US010021169B2

(12) United States Patent
Hendrick et al.

(10) Patent No.: US 10,021,169 B2
(45) Date of Patent: Jul. 10, 2018

(54) MOBILE APPLICATION DAILY USER ENGAGEMENT SCORES AND USER PROFILES

(71) Applicant: Nuance Communications, Inc., Burlington, MA (US)

(72) Inventors: Dan Hendrick, Bellevue, WA (US); Eric Jun Fu, Bellevue, WA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 696 days.

(21) Appl. No.: 14/033,372

(22) Filed: Sep. 20, 2013

(65) Prior Publication Data

US 2015/0088955 A1 Mar. 26, 2015

(51) Int. Cl.
G06F 15/16 (2006.01)
H04L 29/08 (2006.01)
G06F 17/30 (2006.01)
G06Q 30/02 (2012.01)

(52) U.S. Cl.
CPC .......... *H04L 67/10* (2013.01); *G06F 17/3053* (2013.01); *G06Q 30/02* (2013.01)

(58) Field of Classification Search
CPC ...................................... H04L 67/22
USPC ................................... 709/201
See application file for complete search history.

(56) References Cited

U.S. PATENT DOCUMENTS

| | | | | |
|---|---|---|---|---|
| 9,213,729 B2* | 12/2015 | Li | ............... | G06F 17/30312 |
| 2007/0214393 A1* | 9/2007 | Cox, Jr. | ............... | G06F 3/023 |
| | | | | 714/47.1 |
| 2007/0244739 A1* | 10/2007 | Soito | ............... | G06Q 30/02 |
| | | | | 705/7.29 |
| 2011/0219403 A1* | 9/2011 | Nesamoney | ............... | H04N 7/025 |
| | | | | 725/34 |
| 2012/0047509 A1* | 2/2012 | Ben-Itzhak | ............... | G06F 9/4881 |
| | | | | 718/103 |
| 2012/0054020 A1 | 3/2012 | Jacobs | | |
| 2012/0078838 A1* | 3/2012 | Kaufman | ............... | G06N 7/005 |
| | | | | 706/52 |

(Continued)

FOREIGN PATENT DOCUMENTS

| | | | | |
|---|---|---|---|---|
| EP | 1821224 A2 * | 8/2007 | ........ | G06F 11/3466 |
| WO | WO 9641495 A1 * | 12/1996 | ........ | G06F 11/3466 |

OTHER PUBLICATIONS

Extended European Search Report in European Application No. 14184724.4, dated Feb. 6, 2015, 9 pages.

(Continued)

*Primary Examiner* — Hamza N Algibhah
(74) *Attorney, Agent, or Firm* — Onello & Mello, LLP

(57) ABSTRACT

A system logs application usage data on a mobile device, processes the data on an analysis system and outputs a current and predicted score to, e.g. third parties. The system logs application-related usage data, which is collected via, e.g. a keyboard application running in the background on the mobile device. The system then evaluates the logged usage data and the events corresponding to a particular application. The events can be analyzed to score the user engagement level with the application, e.g., more events recorded for a given application per day, the more engaged a user is with that application. The engagement level can further be predicated based on historical usage log data from which a score decay model can be generated.

7 Claims, 9 Drawing Sheets

(56) References Cited

U.S. PATENT DOCUMENTS

| | | | |
|---|---|---|---|
| 2013/0044063 A1* | 2/2013 | Kim | G06F 3/04886 345/173 |
| 2013/0196615 A1 | 8/2013 | Zalmanovitch et al. | |
| 2013/0219272 A1* | 8/2013 | Balasubramanian | G06F 3/023 715/704 |
| 2013/0339284 A1* | 12/2013 | Rowles | G06Q 30/02 706/46 |
| 2014/0006434 A1* | 1/2014 | Chervirala | G06Q 30/02 707/758 |
| 2014/0172478 A1* | 6/2014 | Vadasz | G06Q 10/063114 705/7.15 |
| 2014/0244762 A1* | 8/2014 | Wyndowe | H04L 67/10 709/205 |
| 2014/0258372 A1* | 9/2014 | Lerman | H04L 67/42 709/203 |
| 2014/0270683 A1* | 9/2014 | Zhu | H04N 21/44222 386/224 |
| 2014/0278746 A1* | 9/2014 | Kolowich | G06Q 30/0201 705/7.29 |
| 2014/0280550 A1* | 9/2014 | Glass | H04L 67/22 709/204 |
| 2014/0280890 A1* | 9/2014 | Yi | H04L 67/22 709/224 |
| 2015/0006715 A1* | 1/2015 | Diehl | H04L 43/045 709/224 |
| 2015/0007055 A1* | 1/2015 | Lemus | G06F 3/0484 715/753 |

OTHER PUBLICATIONS

Ye Xu et al.: "Preference, context and communities," Proceedings of the 17th Annual International Symposium on International Symposium on Wearable computers, ISWC '13, Jan. 1, 2013, pp. 69-76.
Office Action dated Jan. 30, 2018 issued in European Application No. 14184724.4.

* cited by examiner

|  | Category Values | Predicted Score |
|---|---|---|
| News | .8, .3, .7, .9 | .7 |
| Sports | .8, .7, .9 | .8 |
| Social | .1, .5, .6 | .4 |
| Entertainment | .4, .3, .3 | .3 |
| Finance | .2, .3, .6 | .4 |
| Shopping | .1, .1, .2, .1 | .1 |
| Utility | .4, .5 | .5 |

User Category Profile

*FIG. 9*

MOBILE APPLICATION DAILY USER ENGAGEMENT SCORES AND USER PROFILES

BACKGROUND

With an annually increasing gross domestic product (GDP) averaging over $15.1 trillion dollars in 2011, companies are constantly grasping for insight into what products and services will obtain consumer interest in order to develop those products/services and develop marketing strategies that target audiences with appropriate advertisements. In a market flooded with products and services, it is often difficult for companies to determine which are actually being utilized and which are disregarded shortly after being used or purchased. Various strategies have been developed to solicit feedback, and usually entail a user providing quantifiable responses to a survey or other form of feedback mechanism.

Surveys and other feedback mechanisms have evolved over the years from in-person surveys, paper and mail surveys, recorded voice surveys, and, currently, to electronic surveys. Most have been developed by companies that could historically gather feedback in person or by hard copies of surveys distributed at the product sale site or by mail. However, with the emergence of new technology, consumers spend an increasing amount of time on cellular phones and other computing devices such that any solicited feedback needed to be easily accessible, e.g., made available through those electronic devices via web forms, and less time consuming. However, in electronic surveys, the responses are often measured on a scale (e.g., 1-10 or low-high) to which consumers hastily respond and rarely provide additional comments regarding a product.

Despite technological advances, it still remains that the most accurate feedback comes from direct user input, such as through a personal interview or product testing on test subjects, both of which often require compensation and time. Though the information gathered in consumer feedback is important, soliciting that feedback is challenging in a world where consumers are becoming increasingly more time-constrained. Accordingly, companies are now investing in various ways to measure indirect consumer feedback such as through interactions with electronic devices, like televisions, mobile devices and computers. This allows marketers, advertisers, and manufacturers to determine what both engages and interests consumers. However, monitoring consumer interactions and inputs to various devices can be considered an invasion of privacy without receiving the express consent of consumers to provide that information. Yet consumers are not apt to allow companies to monitor their personal information, e.g., texts, emails and account information. Thus, what is needed is a way to determine a quantifiable level of interest in a product without soliciting direct feedback from the consumer or invading the privacy of that consumer.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 9 illustrates an example user category profile generated by the computer system in FIG. 3.

DETAILED DESCRIPTION

Figure 1:
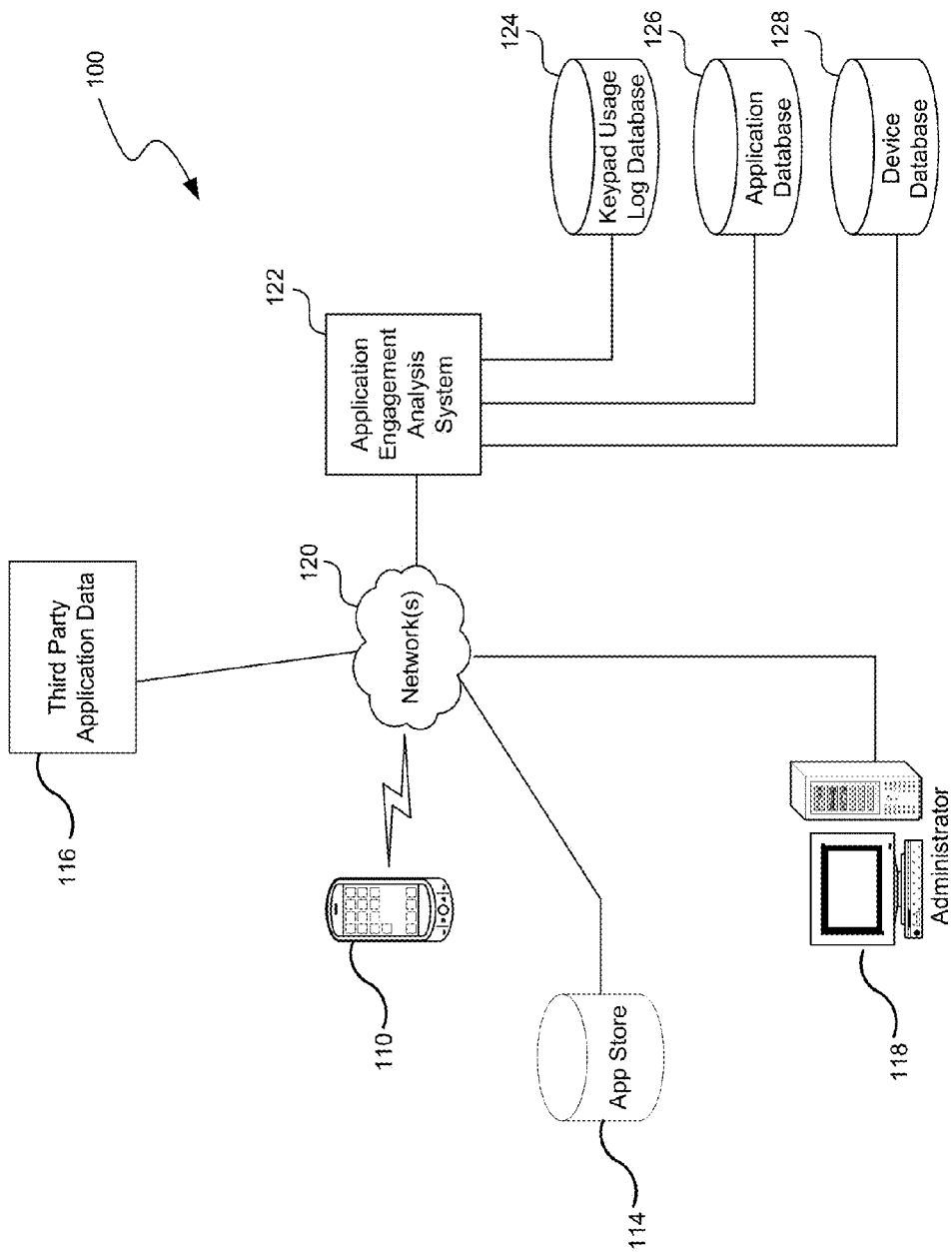
FIG. 1 illustrates an example of a computing environment in which some embodiments of the present invention may be implemented.

Embodiments of the present invention provide systems and methods for utilizing data from mobile application use on a mobile device to provide user engagement level statistics on mobile applications. User engagement levels for any given application can be scored based on usage logs. The usage logs include usage data which is collected through a user input application (e.g. a keypad application), which is stored on the mobile device and which may be invoked each time a user input is requested through a mobile application on the mobile device. The keypad application can be always running on the mobile device (often as a background application), such that each time a predetermined event occurs, the keyboard is presented as a graphical input to a user of the mobile device. Each time that a user interacts with the keyboard, an event time, date and application identifier, identifying the application in which the interaction occurred is recorded. In some embodiments, the location of the mobile device is also recorded. The usage logs can include multiple events recorded for various applications on the mobile device.

Usage logs may then sent over a network to an engagement analysis system in order to calculate a user engagement level for a particular application. The system analyzes the usage logs over a specified time interval and extrapolates events, e.g., usage, for a particular application based on the application identifier during that specified time interval. A engagement level score can then be calculated for a selected day during the time interval by assessing the overall recorded application usage during the specified time interval, the number of events recorded on the selected day, and the amount of usage (e.g., characters input per minute) on the selected day. Similarly, a score can be calculated for categories of applications utilized by the user over a specified time interval. (While the system generates scores based on a day, other time periods could also be used.)

For days in which events associated with an application are not recorded, the system can further analyze historical usage logs to form a decay model of engagement levels in order to predict engagement level scores for those days. (The delay model includes a limited number of parameters to thereby be applicable to a broad range of applications.) The decay model assumes a same score or interest for a recent time, but then a decrease in interest after that. The system can then utilize probability theory to create a statistical model of the predicted engagement level for any given application based on multiple users in the system. For example, the model can be based on probabilistic calculations of the events (e.g. keyboard events) recorded over specified time intervals to determine an application-specific mean rate of use (e.g., based on users across multiple, but similar systems) and last user recorded event for that application.

The system can first determine the number of users that have log data indicating the particular application is installed. Next, the system can detect events defined by the keypad application in which each keyboard use is considered to be an independent event. By maintaining the occurrence of each event as an independent variable, the system can define time as a random variable and measure the time between uses of the keyboard within an application (e.g., presenting the keyboard for input). With a known rate of usage, the variable can determine an average and a standard deviation of time between uses for that particular application and overall determine likely usage rates and usage curves over time for the application.

The system can further provide feedback to advertisers wanting to know how to target advertisements and to application developers and distributors to determine the general public interest in the application. The feedback can be provided in user application profiles and user category profiles. The profiles can be based on the calculated scores, e.g., for time intervals including recorded events, and predicted scores, e.g., for time intervals in which no events are recorded. Score decay models can be created for each of the applications as well as for categories of applications in order to determine the predicted scores in those profiles.

Moreover, the system can provide an application programming interface (API), e.g., a web service, such as for advertisers or application developers, that provides not only the usage data regarding the application, but also additional data such as: date and time when an application was installed/removed (including GPS data associated with such installation/removal); word count via the keyboard, voice recognition, or other input system; letter count via these input systems; session data (number of letters or words within a given time period); any other application programming interface (API) data available via the operating system (Android, iOS, etc.); and, demographic data obtained from external sources. Thus, the system can get intensity of interaction with respect to an application, such as whether the interaction is sporadic or high-intensity for a given session. User specific data can be replaced with anonymized user IDs, and interactions with applications can be aggregated into application categories, such as news applications, sports applications, games, business applications, etc., which can further help to anonymize the collected data.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Without limiting the scope of this detailed description, examples of systems, apparatus, methods and their related results according to the embodiments of the present disclosure are given below. Unless otherwise defined, all technical and scientific terms used herein have the same meaning as commonly understood by one of ordinary skill in the art to which this disclosure pertains. In the case of conflict, the present document, including definitions will control. The terms used in this detailed description generally have their ordinary meanings in the art, within the context of the disclosure, and in the specific context where each term is used. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

System Overview

The discussion herein provides a brief, general description of a suitable computing environment in which aspects of the present invention can be implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including personal digital assistants (PDAs)), all manner of cellular or mobile phones, wearable computers, embedded systems, vehicle-based computers, multi-processor systems, microprocessor-based or programmable consumer electronics, set-top boxes, network PCs, mini-computers, mainframe computers, and the like. Indeed, the terms "computer," and "mobile device" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM or flash semiconductor chips), nanotechnology memory, biological memory, or other data storage media. Alternatively, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Aspects of the invention will now be described. First, a suitable or representative environment in which the invention may be implemented is provided with reference to FIG. 1. The environment includes a network coupled to various inputs that provide application usage data to an application engagement analysis system. The various inputs can include a mobile device (phone) and online mobile application stores. The application engagement analysis system is further coupled to various databases that store data processed by the system to perform various methods of determining application engagement levels. Additional details of each of the mobile device, analysis system and corresponding methods are further described with reference to the remaining figures.

Representative System Environment

FIG. 1 illustrates an example of a computing environment 100 in which embodiments of the present invention may be implemented. As shown in FIG. 1, one or more applications may be stored on a mobile device 110, such as a smartphone, electronic reader, tablet computer, laptop computer or other computing device capable of storing and running the applications. The mobile device 110 may be coupled to a network 120 via a wireless connection (e.g., cellular or WiFi) or hard-wired (not shown) to a computer that is coupled to a network (e.g., the Internet). The mobile device 110 can include various input mechanisms (e.g., microphones, keypads/keyboards, and/or touch screens) to receive user interactions (e.g., voice, text, and/or handwriting inputs). In particular, the keyboard mechanism may be provided by a background keyboard or keypad application stored on the mobile device 110 and may be able to log user interactions and communicate them to an application engagement analysis system 122 via the network 120. (While the keypad application is generally described below for convenience, the system may equally employ any user input application to provide the functionality described herein. Furthermore, while the system is generally described as providing data with respect to a user's interaction with an application, the user's interaction with a website or any other data or executable can be provided by the system.)

The system environment further includes various other entities which are coupled to the network 120 and capable of providing application data to the application engagement analysis system 122. For example, application "app" stores offered through various service providers, such as Amazon (Appstore), Apple (App Store), Google (Google Play), Blackberry (App World), Microsoft (Windows Phone Store), Nokia (Nokia Store), and Samsung (Samsung Apps). Each of these stores can provide application data, such as the application name, developer, purchase price, daily download rate, application category, etc., where this data may be obtained, stored, manipulated and reported by the system described herein.

A systems administrator 118 for the application engagement analysis system 122 and/or for the keypad application may also access the network, e.g., through a computer, in order to provide application data, updates, etc., to the system. Third parties 116, such as data collection agencies that generate or provide demographic data, may also provide data to the system 122 through the network 120.

The application engagement analysis system, also referred to as the "system," can be a server computer coupled to the network via wireless or hard-wired connections, such as the Ethernet, IEEE802.11, or other communication channel known in the art which is formed between the system and the network. The application engagement analysis system collects the application data from various sources through the network in order to determine the engagement level of particular users with an application.

The system 122, may be further coupled to various databases used to store application usage logs 124, general application data 126 (e.g., category, name, identifier, platform), and device-related data 128 (e.g., identification number, stored application listing, though additionally or alternatively, user-related data may be stored such as a related username). In general, the system does not track individual user data, but rather tracks devices (though at times the two may be used interchangeably herein). The application usage logs may also be referred to herein as usage logs, keypad or keyboard logs or application logs. The logs are comprised of user interactions with a keyboard generated by a keypad application which is presented within the interface of another application stored on the mobile device.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirement for some embodiments but not for other embodiments.

Mobile Device

Figure 2:
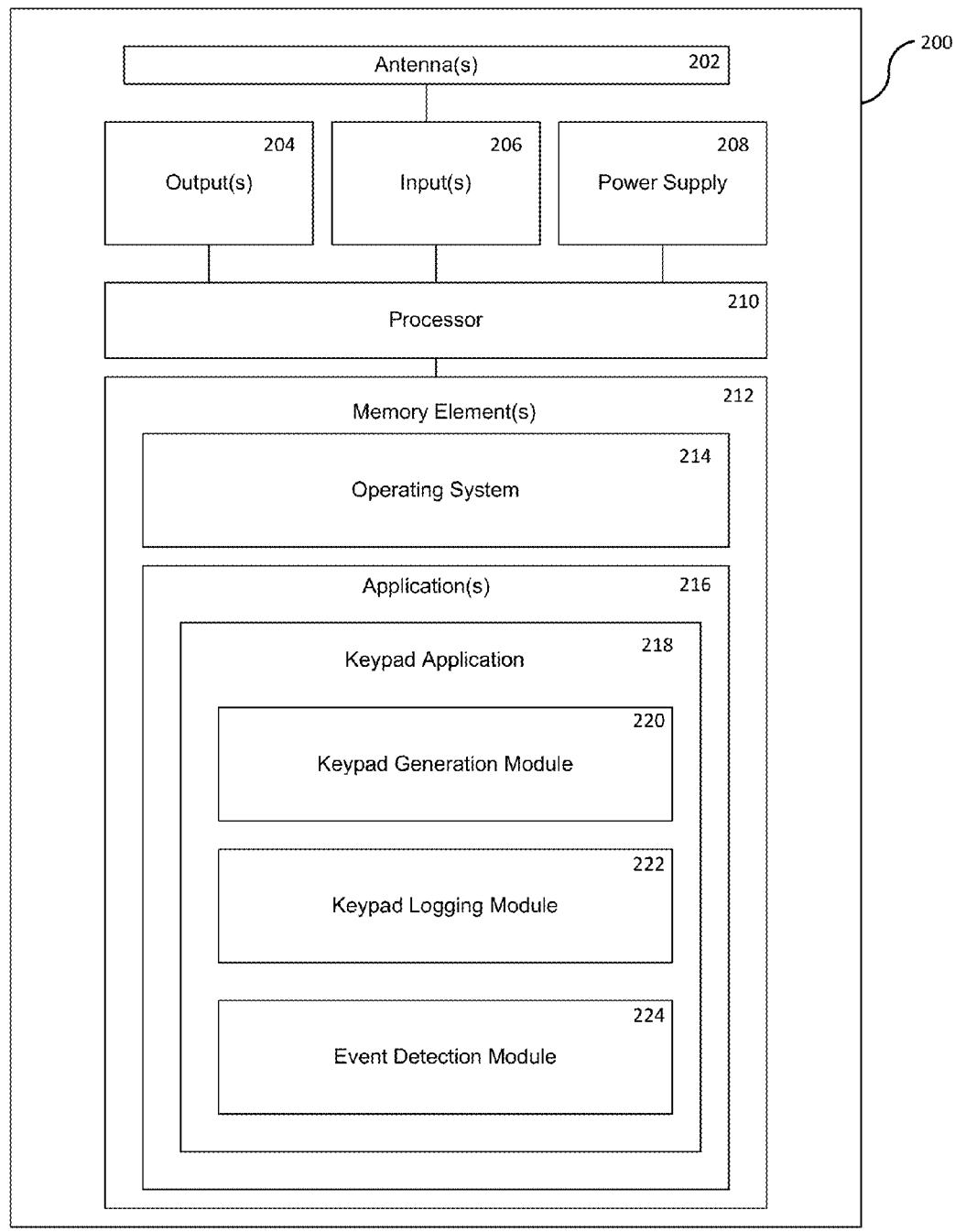
FIG. 2 is a block diagram of components in a mobile device or suitable computing device on which an application is stored.

FIG. 2 illustrates a block diagram of a mobile device 200 which may be utilized in embodiments of the present invention. The mobile device 200 may be a computing device having a storage medium encoded with instructions capable of being executed by a processor to perform methods disclosed within those instructions. The mobile device 200 may be a smartphone, tablet computer, netbook, mobile GPS navigation device, fixed telephone or communications console or apparatus, surface or tabletop computer, desktop computer, e-reader, personal wireless device (e.g., mobile hotspot), or any other device capable of storing an application and generating a virtual keyboard on a display of the mobile device 200. The mobile device 200 includes various hardware and software components configured to provide information to an application engagement analysis system and to record and temporarily store user interactions, or inputs, to a virtual keyboard on a mobile device 200. Each of the components within the mobile device 200 may be connected to a system bus (not shown) capable of transferring data between those components. Mobile device 200 also has a power supply, such as a battery, which is capable of providing power to each of the components within the mobile device 200.

The mobile device 200 includes one or more antennas capable of communicating via a radio network with a cellular communications network (e.g., GSM, CDMA, 3G, 4G), a local wireless area network (WiFi) with the Internet, near field communication (NFC, RFID), Bluetooth, and satellite (GPS). The antennas 202 may be coupled to a processor 210, which is capable of sending and receiving communication signals to/from the aforementioned networks and the mobile device 200. Various inputs 206 and outputs 204 are also included in the mobile device 200. For example, the inputs may further include a touchscreen, keys or buttons, accelerometers, cameras, and a microphone. The outputs may include, for example, a speaker and a display. Each of the inputs and outputs are coupled to a processor, which is capable of performing the functions of the mobile device such as, receive data through inputs, send data to outputs, and store and retrieve data from the memory elements, or storage, on the mobile device 200.

The processor 210 may communicate with data or applications stored in a memory element(s) 212 of the device 200. The processor may additionally include a digital signal processor (DSP), application/graphics processor, or other types of processor, dependent on the additional components within the mobile device 200. The processor 210 may be couple to one or more memory elements which may include a combination of temporary and/or permanent storage, and both read-only and writable memory, such as static and non-static random access memory (S/RAM), read-only memory (ROM), writable non-volatile memory such as FLASH memory, hard drives, SIM-based components, and other computer readable storage mediums. The memory element(s) 212 is encoded with various program components or modules, such as an operating system 214, various applications 216, such as applications downloaded from an application store to the mobile device 200, and a keypad application 218, or program, and corresponding program subroutines.

The keypad application can include various programs or modules which perform the functions of the application. For example, the keypad application can include a keypad generation module 220, a keypad logging module 222 and an event detection module 224. The event detection module 224 can detect when a predetermined user interaction, or input, has occurred on the mobile device which warrants the use of the keyboard. For example, if the user selects a text entry field in an electronic mail (email) application or into a website, e.g. via an input mechanism such as a touchscreen, the event detection module can detect that user input as an event. In another example, if a user selects an application to download from an application store, the event detection module can determine that user input as an event.

The events detected by the event detection module 224 can then trigger the keypad generation module 220 to present a virtual keyboard on a touch-sensitive display screen of the mobile device. For mobile devices which include physical keyboards on the device, the keypad generation module may be omitted, while those that accept wired or wireless keyboards may detect connection to such a keyboard. The keypad generation module 220 can also be responsible for removing the virtual keyboard from the display once the user has finished a session, i.e., finished a particular entry, as well as changing the size, language and position of the keyboard dependent on the user's preferences and physical position of the mobile device.

The keypad logging module 222 can be utilized to temporarily record keyboard entry, or input, statistics for each event triggered, and for each session. For example, the keypad logging module may log a session with a number or other ID, a number of key input events, and a time and date, and application used, e.g. as session 123456, 23 key events, Jan. 1, 2013, 9:34A, app1234. In this example, the keyboard being presented on the display indicates initiation of a session (here as session "123456"). The number of keys utilized can be indicated by the "23 keys" (but actually keys input are not logged). The application in which the event occurred can be indicated by an application identifier "app1234", which is also utilized on the application engagement analysis system 122 application database 126.

Each session occurring during a predetermined time interval can be incrementally numbered. In other embodiments, the sessions can be numbered in each usage log, with usage logs recorded over predetermined time intervals, such as by the hour, day, week, month, etc., and thus being differentiated from each other by date and timestamps. In other embodiments, usage logs can be recorded until a predetermined number of key input events have been logged. In further embodiments, usage logs can be recorded until a predetermined amount of memory is being utilized on the mobile device 200 or when the file size of the usage log is becoming too large to send to the engagement analysis system 122.

Any number of events or event attributes can be logged by a mobile device 200 through the keypad application 218. In some embodiments, the event attributes, or characteristics of the event, can be detected or determined by the mobile device and stored in the memory within that device. In other embodiments, the different types and number of events/attributes recorded in a usage log can be determined by the keypad application 218, version of the keypad application 218 and the platform on which the keypad application is being utilized. Alternatively, the types and number of attributes within the usage logs can be determined by the application in which the keyboard is being called.

As previously mentioned, the keypad application 218 can be stored in memory 212 of the mobile device 200 and can be always "on", or running in the background on the mobile device. Accordingly, whenever an event occurs on the device, the keyboard can be presented to the user and the device can log the input events. The keypad application can be always running after installation on the mobile device, or through manual set up by a user of the device. Alternatively, the keypad application is launched and presented on the display only when called by the user. For example, if a user selects a text field in application on the device, the user may also select a button or selection of buttons which invokes the keypad application. Accordingly, the user interactions or inputs and subsequent invocation of the keypad application can be recognized as an event by the keypad application.

Application Engagement Analysis System

Figure 3:
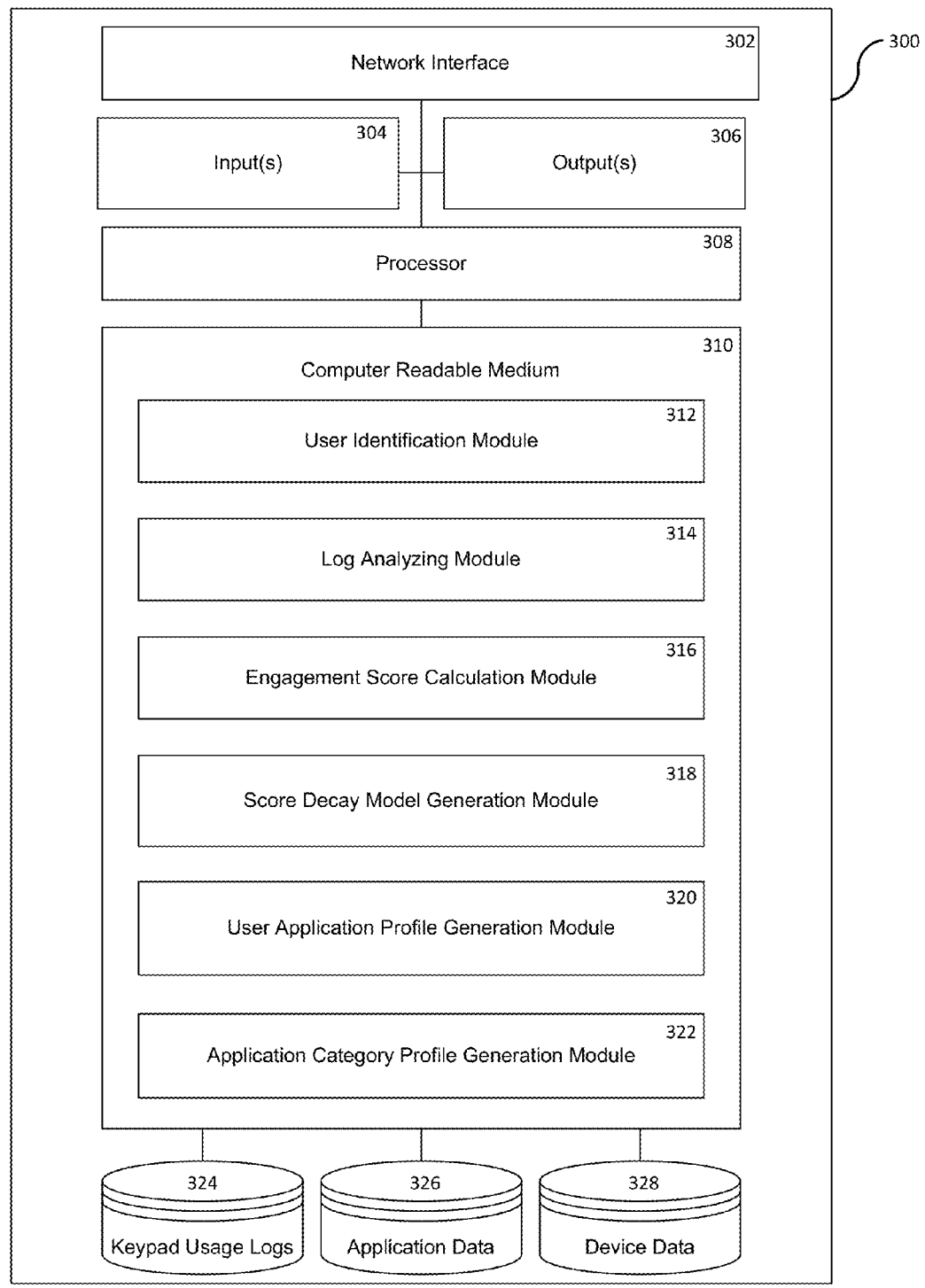
FIG. 3 is a block diagram of components in a computing system configured to determine a user engagement level for an application stored on the mobile device in FIG. 2.

FIG. 3 illustrates a system computer 300 on which the application engagement analysis system may be implemented. The system computer 300 includes a network interface 302 for receiving usage logs via a network such as the Internet. The interface 302 can include a wireless interface, such as based on the 802.11 IEEE standards, or a hard-wired interface, such as a Ethernet port for receiving a standard RJ45 connector. The system computer 300 components further include various inputs 304 and outputs 306, such as peripheral devices, for example. The system computer 300 further includes an operating system 309, various modules 312, 314, 316, 318, 320, 322, including instructions for methods performed by a processor 308 of the system computer 300, and various databases 324, 326, 328, for storing data utilized by the processor 308 when performing the aforementioned methods. The network interface 302 and other components of the system computer 300 may be connected to a system bus (not shown), which is capable of transferring data between each of those components and a system processor 308, such as a central processing unit (CPU). The processor is capable of executing instructions stored on a computer readable medium (CRM) 310 to perform the methods of the various aforementioned modules.

The modules may include a user identification module 312, a log analyzing module 314, an engagement score calculation module 316, a score decay model generation module 318, a user application profile generation module 320, and an application category profile generation module 322. Each of the modules can access data stored in one or more of the databases 324, 326, 328, coupled the computer system 300 in order to perform the methods specific to that module.

A user identification module 312 can determine the mobile device and corresponding user ID for which new usage logs are received through the network interface for, e.g., storing the usage log data in the appropriate database locations. Additionally, the user identification module 312 can be utilized to locate and retrieve a particular user's corresponding data stored within the databases prior to performing the scoring method and/or prediction method for that particular user, as discussed below. In some embodiments, the user identification module 312 can additionally be utilized to assign user identification numbers to users in the system computer 300. For example, if the users are identified via a mobile device number, such as by a hardware identification (e.g., IMEI or iDEN number) or a software resettable number (e.g., Android ID), the system may assign a shorter identification number to that device and user or other number, including randomly assigned IDs, to facilitate storing personally identifiable information regarding users.

A log analyzing module 314 can analyze the usage log data for each log received on the system and identified by an associated user ID. As previously discussed, the usage logs can include data relating to any number of attributes associated with a user's interactions with a mobile device. The usage log analyzing module 314 can index log data according to specific attributes, such as user ID, date, application (in which keyboard invoked), etc. The usage log analyzing module 314 can further analyze each log to determine additional statistics for each log. For example, the number of events occurring in the log, the sum of key strokes entered for the log (or per session and/or per application or event), the number of applications in which events occurred per day, week or month, etc. Providing the aforementioned log analysis on the engagement analysis system alleviates the processing necessary for usage log data on the mobile device.

An engagement score calculation module 316 utilizes the usage log data and corresponding statistics to determine an engagement score for an application in which the keyboard is invoked. The score may be defined over three (3) variables for which data is provided in the usage logs. The three variables over which the score is calculated include the user, the application and the date. Though only three variables are utilized within the present embodiment, it should be understood that any number of variables may be utilized to further define the score. Furthermore, the variables could include, for example, a group of users, a category or other grouping (e.g., by developer) of applications, a week or other period of time over which the score is defined.

The engagement score calculations module 316 may utilize usage log data received from the network interface, e.g., during the original input computation in which the usage data is analyzed and stored as well as usage log data already stored on a usage log database 324 coupled to the system computer 300. For example, the engagement score calculation module 316 may calculate the number of days of keyboard use during the previous N days (e.g., for a week long interval). In order to determine this statistic, the engagement score calculations module 316 may reference the usage log database 324. The method for calculating the score is further described in the following paragraphs with reference to FIG. 4.

Once the score is calculated, the engagement score calculations module may store the score as defined over the three variables in an application database 326 coupled to the system computer 300. Accordingly, last calculated engagement score for that application is maintained current and available in the system computer 300. From the single numeric score for the specific user, application and date, the user's general level of interest in that application can be inferred on any given day or other time period.

A score decay model generation module 318 may utilize the aforementioned current score for any given application to predict the score for that application on days in which no keyboard usage occurs on the mobile device in that application. For example, if an application is opened, navigated and closed, but no textual input or other inputs are required, the mobile device may not record any usage of that application for that particular day as no events were triggered. However, the user did use the application. The score decay model is generated to acknowledge that usage through a predicted engagement level based on historical usage of that application. Accordingly the score decay model is based on the variables set forth when calculating the engagement level score in the engagement score calculation module 316. Dependent on the particular parameters entered for score calculations, the score decay model may be calculated for a particular application, user, set of applications, application category, or other attribute defining the calculated score in the score calculation module 316.

The score decay model generation module 318 can utilize the historical data stored within the usage log database 324 to generate a decay model over a specific time interval. The time variable (e.g., time between two detected keyboard events or between two sessions) over which the decay model is calculated can be a random exponential variable which is independent of any previous or future keyboard usage. The two input parameters utilized to generate the linear score decay model can include (1) the number of days with no keyboard activity at a current score, and (2) the number of days with no keyboard activity where the score should be reduced to zero (0). The score decay model, decay model equations, and generation thereof are further discussed in the following paragraphs with reference to FIGS. 6-7.

The generated score decay module 318 may be maintained on the system computer usage log database 324 until a new score is calculated for a particular application, user or category of applications, for example. In other words, until new usage log data which alters the current score associated with an application is received, the score decay model can be utilized to predict the application score on a specified day.

If other input variables, or parameters are defined for a particular application, e.g., that application is included in a category, or, a score is generated for various time intervals, the score decay model and predicted score for that application consistent with those variable will only be modified when those particular variables are utilized to recalculate a score and/or decay model. Accordingly, any given application stored in the application database may have numerous associated scores, each having differing parameters which define them.

A user application profile generation module 320 may generate an engagement profile for applications associated with a particular user. The profile may include a listing of the user's applications, a corresponding current score (e.g., last calculated score maintained on the usage log database 324), and a predicted score for a particular day. The system user may be able to manually enter the day on which the predicted score is provided or the system may determine (e.g., through the current score decay model) a predicted score for the particular day during which the user is viewing that profile. In other embodiments, the system may generate a predicted score over numerous days, allowing the user to determine whether a particular application score is beginning to decay, i.e., there has been no logged usage in a specific time interval. Additional application attributes may also be shown within the user application profile, such as the user ID, the application ID, the day and/or time interval over which the profile is generated, an application usage ranking (e.g., usage rate compared to other applications stored on the mobile device and/or used in the specified time interval), and any other attributes which both are relevant to the application usage and can be determined from the application usage logs. An application user profile is further described with reference to a profile illustrated in FIG. 8.

An application category profile generation module 322 may generate a profile for a specific user's applications based on the application category. The categories may be assigned by a user, developer, application store, administrator, or third party application provider. For example, a user may have folders of applications on their mobile device. Each folder may be labeled with a specific category identifier, as assigned by the user. Accordingly, each of the applications associated with that category may be analyzed together in order to calculate a particular engagement level for that category. In other embodiments, a developer or application store may assign a particular category and/or subcategory identifier to each application made available for download to a user device. For example, an application store may categorize applications as sports, shopping, entertainment, games, reference, social networking, photography, etc. A generated application category profile may then include a listing of each category of applications for a particular user, a listing of the current (or last calculated) score for each application in that category, a time interval over which the profile is being viewed, and a predicted score for that category. The predicted score can be generated based on the sum of the last calculated scores, rates of events/sessions occurring in the time interval, and previously generated predicted scores for each of those applications. Because numerous applications are associated with one category, the likelihood that one application has had a recent detected event is high. Accordingly, the predicted score can include an average of the predicated and calculated scores for each application on a particular day, for example. Further description of the functions provided by the application category profile generation module 322 is provided with reference to FIG. 8 in which a application category profile is illustrated.

Methods which can be implemented on the aforementioned devices and systems illustrated in FIGS. 1-3 are now described. Reference to particular components within those systems and devices may be indicated by a numerical identifier corresponding to those figures.

Data Collection: Usage Logs

Figure 4:
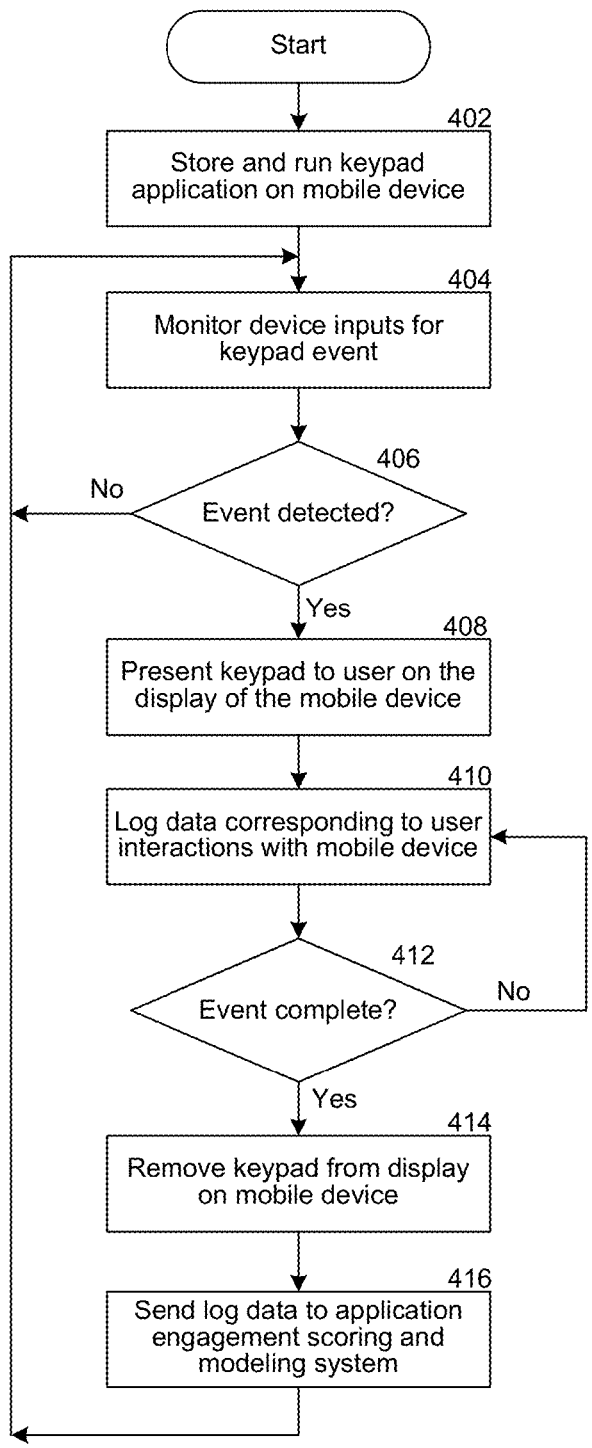
FIG. 4 is a flow diagram illustrating a method for analyzing user inputs to a mobile device to compile usage logs based on user interactions with the mobile device.

FIG. 4 provides a flowchart of a method for collecting usage data from a keypad application stored on a mobile device. The method includes installation of the keypad application, event detection and logging by the keypad application and subsequent transfer of the logged usage data to the application engagement analysis system.

At block 402, a user may download and store the keypad application on his or her mobile device 200, though in many instances the application may be stored on the device at the time of purchase. The user may connect to the Internet via a wireless LAN and visit an application stores, such as one supported by the platform on which the mobile device is running, such as Apple or Windows, or, by a third party application store, such as Amazon. Once the user has downloaded the keypad application, the user can select to run the application or it may automatically run. The application then may be always running as a background application, though the keyboard is not always visually present on the display of the mobile device in the instance of a touch screen display. In other embodiments, the user can manually select and modify the application settings in order to override current keypad applications on the mobile device and/or select the application each time that the user wishes to enter text. In further embodiments, the application can be preloaded in the mobile device prior to any user interaction with that mobile device.

At block 404, with the keypad application running in the background of the mobile device, each user interaction (e.g., input event) with the device can be monitored by the application. Each interaction meeting a predetermined criteria can be an event. An event indicates that the keypad application should present a virtual keyboard on the display screen of the mobile device and begin recording the inputs to that keyboard for a session. Any user interaction which may solicit a user textual, voice or other input accessible via the keyboard (or other input device) generate by the keypad application may be considered an event. Additionally, other system inputs may be considered events, such as the downloading and installation of an application and/or the deletion and removal of an application.

At block 406, the keypad application can determine if an event has been detected. If no event has been detected, the keypad application continues monitoring the mobile device at block 408. If an event has been detected, the keypad application is fully invoked. Accordingly, at block 408, when an event is detected on the device and a user is prompted to enter text for a password, or, a user selects a text field within an application already stored on the mobile device, a virtual keyboard is presented to the user.

The keyboard may be in any language or form as selected by the user in the user preferences. Furthermore, additional "add-ons" to that keyboard may additionally provide inputs which are recorded by the keypad application. For example, the user may install additional add-ons to provide keyboards in different languages or include icons, pictures or art. For each event logged, the keyboard can also record the language used to generate the input. In some embodiments, a microphone may be invoked by selection of a key on the keyboard, or, each time that the keypad application presents the keyboard to the user. In any of the aforementioned embodiments, three or more add-ons may be utilized at the same time, with the keypad application recording usage data for two of those add-ons at the same time. For example, if a language add-on is integrated into the keyboard presented by the keypad application, then the keypad application may log usage data each time the keyboard is utilized in that language.

The keyboard application primarily interacts with a single foreground application on the device. Accordingly, each time that the keyboard is invoked within another application on the mobile, the data log within the foreground application includes the application data in which the keyboard is presented. For example, if the keyboard is presented in an application, such as a short message service (SMS) application, the keypad application may create an event and record usage data in a log for the SMS application. If a language add-on was utilized in the SMS application, the keypad application may additionally create an event and/or record usage data in a log for the language add-on and/or in the same event and usage log as the SMS application. In an embodiment where the microphone is invoked, the usage time of the microphone/speaker may be recorded in association with an event and an application usage log.

At block 410, any input received through the keyboard presented to the user by the keypad application is recorded in a usage log corresponding to that application. The usage log can be further associated with a particular event which triggered the presentation of the virtual keyboard. Any number of usage statistics, as legally permitted and if required, agreed to by a user of the mobile device, are recorded. For example, the number of keystrokes, the number of words, the language of the keyboard, the application in which the keyboard is presented, the time lapsed during input, the time the keyboard was first presented, the date, etc. can be recorded in the usage log.

At block 412, the keypad application determines if input events are complete and a session has ended. For example, in a single session, the keyboard may be invoked multiple times. If a user opens application A and selects a text box to enter a text message (e.g., SMS, IM, email, etc.), the keypad application may log an event, event 1, and the user may stop entering text and/or be interrupted via a received response text during that event. Accordingly, the keypad application can determine that a session is over, e.g., when a specific input key is selected on the keyboard such as "enter", after a predetermined time interval in which no keyboard entries have occurred (a timeout), when an application is closed, when the mobile device enters a sleep or low-power mode, etc. If the session is not complete, the keypad application continues to log data corresponding to the user interactions with the presented keypad on the mobile device, at block 410. If the keypad application determines that the session is complete and no new input events are likely, the keyboard is removed from the display of the mobile device at block 414.

At block 416, the keypad application sends the usage logs to the application engagement analysis system 300. The usage logs can be sent after each session is determined to be completed on the mobile device. In other embodiments, the usage logs are sent at predetermined time intervals or when a temporary storage element of the mobile device reaches a threshold limit.

The analysis of the usage log data and the scoring and predicted scoring of the engagements levels for each of the applications on the mobile device are described in the following section with references to FIGS. 5-8.

Application Engagement Scoring

Figure 5:
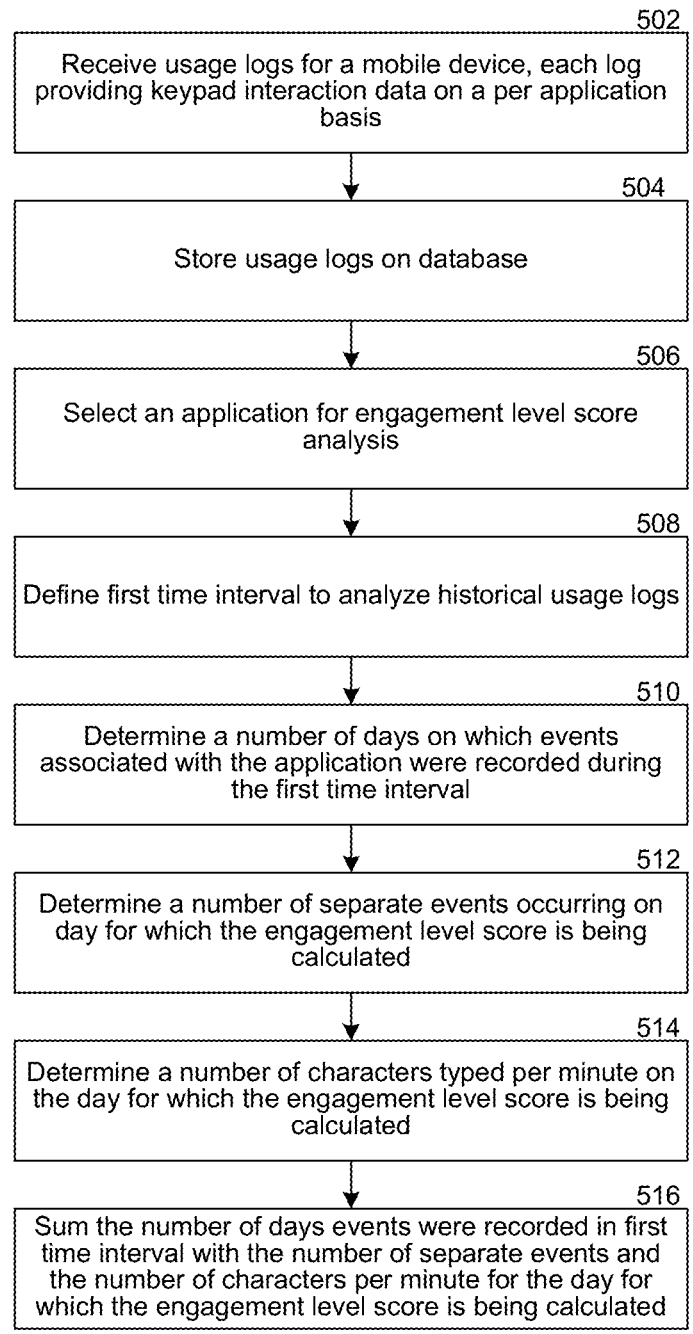
FIG. 5 is a flow diagram illustrating a method for analyzing usage logs from a user's mobile device to determine an engagement level score for an application stored on the mobile device.

FIG. 5 provides a flowchart of a method for calculating an application engagement score in an embodiment of the invention. The method includes reception of the usage logs from the mobile device, analysis and indexing of the data received and calculation and storage of the engagement level scores for a specified application.

At block 502, usage logs are received from the mobile device 200. Each usage log can correspond to a particular application stored on the mobile device of the user. The usage log can provide statistics on the user interactions (i.e., inputs) with a virtual keyboard presented on the display of the mobile device. The usage log data can be recorded based on event.

At block 504, the application engagement analysis system can store the usage log data on one or more databases coupled to the system. For example, the system can include a usage log database in which all raw, or unprocessed data, is stored. alternatively, the system can analyze the usage logs received in block 502 to determine the application and/or user to which each log corresponds and store each corresponding log on an application database or user database. Since the data in each usage log is identified, e.g., by date, application ID and user ID, the usage logs can be indexed in the usage log database according to those parameters as well.

At block 506, a particular application can be selected to determine the engagement level of a user. In some embodiments, the selection is a manual selection based on a user of the system, such as an administrator or an advertiser. In other embodiments, the system has predetermined time intervals by which a specified user and/or application is analyzed to update the current scores within the system and are reported automatically to the user. In yet another embodiment, the system automatically analyzes each new usage log when received by the system.

At block 508, a time interval N over which the usage log data is analyzed for a particular application is determined. For example, an application engagement level for any given day may be determined by a calculated engagement score. The engagement level for a particular day is measured against historical usage log data. Accordingly, the application engagement level may be calculated in comparison to a previous day, days, week, month, etc.; the time interval against which the engagement level score is calculated is dependent on many factors. For example, for a newly downloaded application, only a few days of usage log activity may be available on a usage log database of the system. In another example, an application may only have usage data for a day occurring in the previous week, necessitating the time interval to be a week long. The longer the time interval is defined, the more accurate an engagement level is calculated.

At block 510, for time interval defined by N the application engagement analysis system determines the number of days on which usage data was recorded for that application. For example, if the time interval is a week, and application A has only three (3) associated events occurring on two (2) separate days, the number of days is two (2).

At block 512, the system determines the number of sessions, or events, which occurred on the day for which the engagement level score was calculated. As previously discussed each time that a specified set of predetermined parameters are detected by the keypad application running in the background on the mobile device, an event occurs which triggers the keyboard to be presented to a user. However, if the keyboard is presented multiple times to the user in an application over a short time interval, e.g., during an IM session, etc., the multiple presentations of the keyboard may be included in a single event. Accordingly, though the keyboard appeared ten (10) times on the mobile device display, only three (3) events may be recorded for that day.

At block 514, the engagement analysis system determines a number of characters typed, or typed per minute, on the day for which the engagement level score is to being calculated. The characters typed per minute is a variable statistic. In other embodiments, the variable may include a number of words, a specific key usage (e.g., "enter"), or another variable defined by the system. For example, using the aforementioned three (3) events occurring on the day for which the engagement score is being calculated, the system can determined that forty (40) keys were typed in Session 1 over two (2) minutes, one hundred and forty (140) keys were typed in Session 2 over three (3) minutes, and twenty (20) keys were type in Session 3 over six (6) minutes. The number of keys typed per minute is then calculated to be approximately eighteen (18).

At block 516, each of the aforementioned inputs can be summed to determine a numerical score for the engagement level of the application. The components of the sum can additionally be weighted, e.g., multiplied by a weighted amount. For example, one or more usage logs for user A, application 1234, on Jan. 1, 2011, may be received by the engagement analysis system. Using the aforementioned keyboard usages in past N days as 2, number of keyboard sessions as 3, and number of characters types per minute as 18, the engagement level score can be calculated as:

$$\text{Score}(A, 1234, 01/01/11) = 0.3*(2) + 0.2*(3) + 0.1*(18). \quad \text{(Equation 1)}$$
$$= 3.0$$

The application engagement scoring calculation functions when a user utilizes any application on a weekly, if not daily basis. However, some applications may not be accessed so frequently by a user. For example, a user may only access a banking application once or twice a month when bills are due. A user maintains engagement with the application because that application is still used monthly; however, it is not accessed daily or weekly, which may skew the engagement level score when assessed, for example, during the middle of the month. Similarly, because one of the factors in scoring the engagement level of the application is based upon keyboard interactions associated with that application, some applications may not even register an event has occurred when accessed. For example, an application in which a user primarily reads or inputs via touch rather than text. Accordingly, a predictive model may be generated for each application and/or category of application based on the user's historical usage date and calculated engagement level scores. This predictive model, called the score decay model, is further described in the following section with reference to FIGS. 6-8.

Application Engagement Prediction: Score Decay Model

Figure 6:
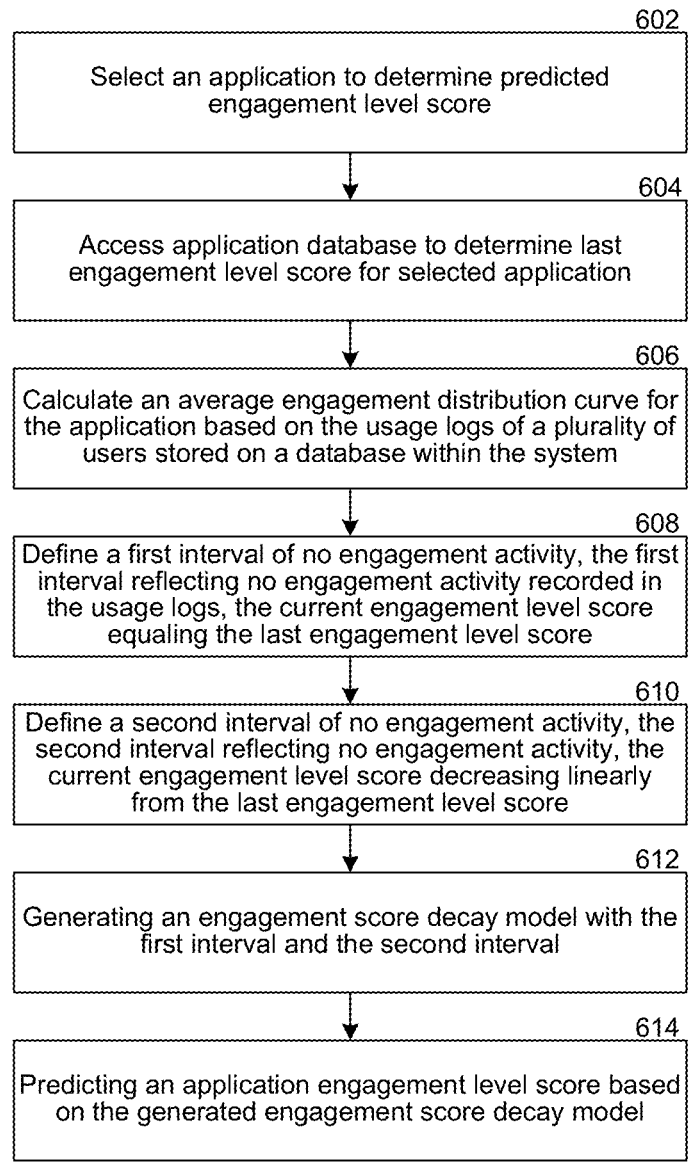
FIG. 6 is a flow diagram illustrating a method for predicting user engagement level scores based on a linear decay model.
Figure 7:
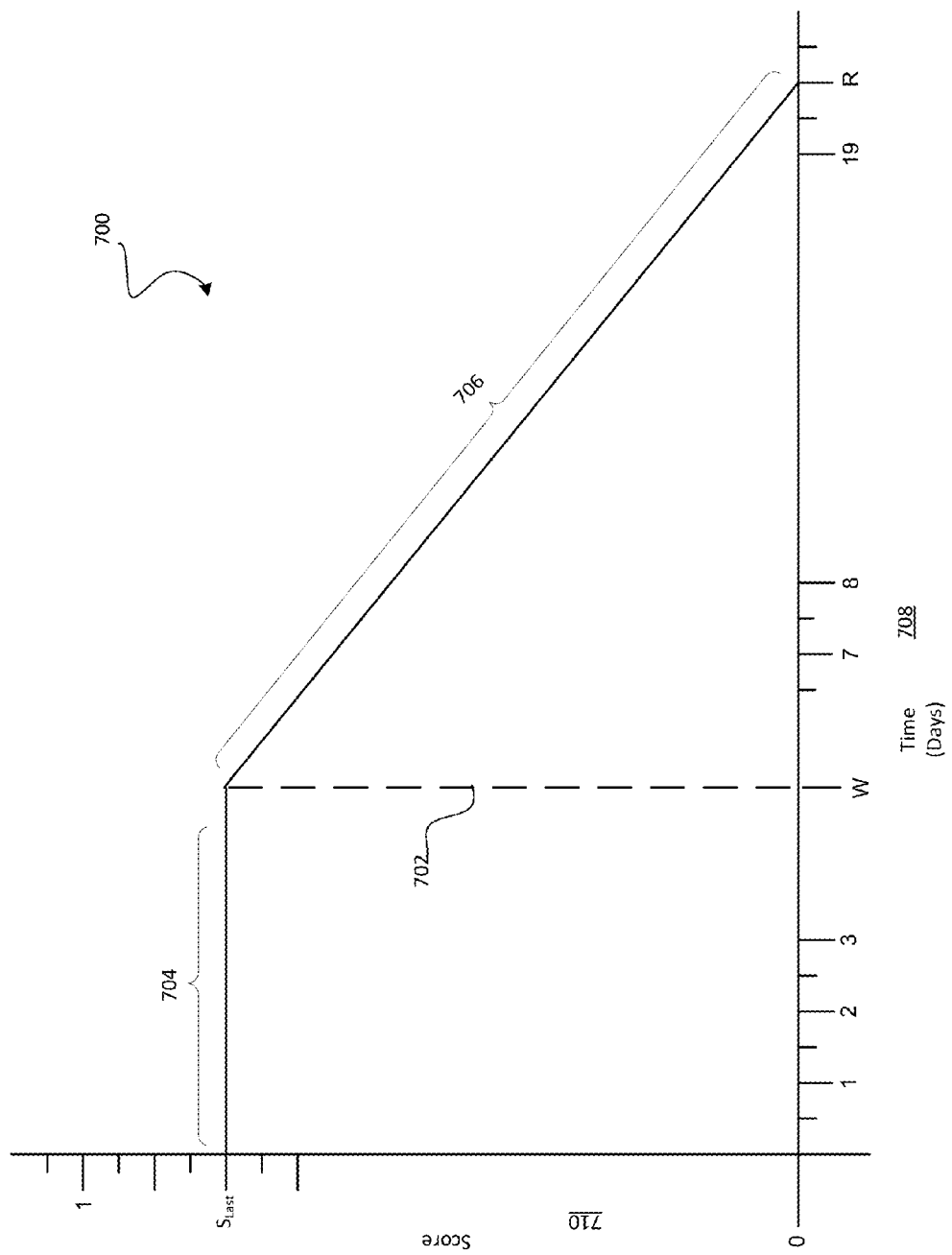
FIG. 7 illustrates a graphical representation of a linear decay model.

FIG. 6 illustrates a flowchart of a method for generating a score decay model for an application on the application engagement analysis system. The method includes retrieval of stored score data for a particular application, analysis of usage logs for that application, generation of decay model, and generation of user application profiles and application category profiles. FIG. 7 illustrates an exemplary linear score decay model which can be generated from the method in FIG. 6. FIG. 7 is referenced in the discussion of FIG. 6.

Referring to FIG. 6, at block 602, an application is selected for which a score decay model is to be generated. In some embodiments, a category of applications is selected. The score decay model captures the basic idea of a user losing interest over time with only a few parameters as input, which decreases the complexity of the decay model. Specifically, the engagement level score decay model has two parameters which determine the behavior of the predicted score output. Both parameters relate to a general averaged time period between keyboard usages for any given application. The parameters can be each represented as a time interval over which no engagement activity has been detected, e.g., no events detected or indicated in the usage logs for that application. A first interval can be a time interval in which the predicted engagement level score is equal to a last engagement level score. A second interval can be a time interval in which the predicted engagement level score decreases, e.g. linearly.

At block 604, the system determines a last engagement level score of the application for which a score decay model is being generated. The last engagement level score provides a base score at which the score decay model begins and can be stored on an application database coupled to the system. The last engagement level score is the last score calculated for that application using the same parameters.

At block 606, the system then calculates a distribution curve corresponding to the average (engagement) decay rate for any given mobile application. The average decay rate can be determined by first calculating an average rate of keyboard usage during a time interval defined over a time period including at least two (2) usage logs having detected events, i.e., having engagement activity, where each log may have data for one or more sessions. The average rate can be represented by a variable, $\lambda$, and is estimated by using a historical collection of keyboard usage logs associated with that application. The historical usage logs can be identified by first determining which users have installed the application, e.g., via download event in the usage logs and then determine the average rate over the defined interval for each of those users. The historical usage logs can be stored on the usage log database within the system and can be associated with keyboard usage for multiple users.

After determining the average rate of keyboard usage over the aforementioned time interval, the waiting time between keypad application events occurring, e.g., keyboard usages, can be modeled as an exponential random variable, T, with the average rate, $A\lambda$, as a parameter. The score decay model for the first interval, W, and the second interval, R, can be represented by the following equations:

$$W = E(T) \quad \text{(Equation 2)}$$

$$R = E(T) + 3*SD(T) \quad \text{(Equation 3)}$$

The standard deviation can be represented by SD(T) and the linear decay can be estimated to reach zero (0) at a range of W plus three (3) standard deviations from the peak of the distribution curve. The first interval, W, and second interval, R, can then be computed by utilizing the estimated average rate of keyboard usage, e.g., the calculated rate over the defined time interval, as $E(T)=1/\lambda$, and $SD(T)=1/\lambda$. Separate score decay models can then be defined by each application based on that applications' calculated average rate of use.

At block 608, the first interval, W, is defined based on the computation of $E(T)=1/\lambda$. The current score for that application is held constant during the first time interval, W. A graph 700 of a score decay model is illustrated in FIG. 7. The score decay model 700 has a y-axis 710 equal to an engagement level score and an x-axis 708 measured in days (or any other time unit in which the time interval is defined). The graph 700 indicates the first time interval 704 with a current score, shown as $S_{Last}=0.8$ in the graph 700, is initially held constant because no additional usage data is known to the system within that first interval 704 and only the last engagement level score, determined at block 604, is the only known value.

At block 610, the second interval, R, is defined based on the computation of $E(T)+3*SD(T)$, where both $E(T)=1/\lambda$, and $SD(T)=1/\lambda$. The second interval 706 declines from the end point of the first interval 702, e.g., at $W=1/\lambda$, until the engagement level score is equal to zero (0), e.g., estimated to be at three standard deviations from the end point (i.e., mean engagement level score) of the first interval as illustrated in FIG. 7. Similar to the first interval 704, the second interval 702 reflects a time period with no detected events, or no engagement activity. The second interval has a start value equal to the last engagement level score ($S_{Last}$) and an end value of zero.

At block 614, a score decay model can be created for an application with the value of the last engagement level score value, the value of W, and the value of R. The score decay model for each application can be stored on the system, such as in the application database. The score decay model can be update periodically, by manual user input, or based on new usage log data being received by the system from one or more mobile devices.

Each of the steps provided in blocks 608-612 can be completed substantially simultaneously. Furthermore, the score decay model may include additional or less standard deviations to estimate the decay rate, depending on the distribution curve. In another embodiment, numerous score decay models can be analyzed in order to determine engagement level trends over time. For example, a mobile application newly released on the market at a cost may have a score decay model substantially different than two or three months after release and/or if the purchase price is dropped or altogether removed. Generating numerous score decay models juxtaposed in a single graph for, e.g., advertisers or developers, can provide comparative feedback regarding the future market for that application or similar applications.

At block 614, the system can utilized the score decay model for any given application to predict a user's engagement level on days when usage log data is available. For example, referring to FIG. 7, a user has a last engagement level of 0.8 on Day 0 for which an engagement level score was calculated, (e.g., using the method in FIG. 5). Day 1 has no recorded events and Day 2 has no recorded events in the usage logs. The system can generate a score decay model for the application on Day 1 to predict the user engagement level score for that application. Then, the system can utilize that score decay model to predict the engagement level score on Day 3, 4, 5, 6 and so on. Accordingly, in FIG. 7, the predicted score on day 4 is still 0.8. However, the prediction for Day 8 demonstrates a 0.25 drop to a score of 0.55. This engagement level drops demonstrates that, though some unrecorded engagement activity occurred, such as scrolling through pictures or multi-media messaging (MMS) a picture, the engagement level for that particular application is decreasing. If a user is not losing interest, but simply has not participated in any activities within that application necessitating keyboard usage, the system can also predict this engagement level based on the application's score decay model. This is because, probabilistically, if one or more users utilize an application and record numerous events in that application in a short time span, the decay rate will reflect that amount of usage. However, if an application is utilized frequently, but requires less keyboard usage (e.g., few events are recorded over a larger span of time), then the decay rate will also reflect that amount or type of usage.

In some embodiments, the system can check the application database to determine if a score decay model has already been generated, e.g., for another user, in order to predict a user engagement level score for a particular day. Accordingly, a score decay model may not be generated each time that a user does not have any engagement activity for a particular application over a specified time period. In other embodiments, the system can determine the date of the last generated score decay model in order to determine if that model is up to date and whether a new model should be generated.

The score decay models and the actual calculated scores can provide numerous representations, including visual representations, of the user engagement levels for, e.g., marketers, advertisers, developers, etc. For example, the aforementioned score decay models reflect the current engagement level score and the predicted scores. In another example, the current and predicted scores can be utilized to generate an application user profile as well as category profiles. These profiles are further described in the following sections with reference to FIGS. 8-9.

Application Profiles

Figure 8:
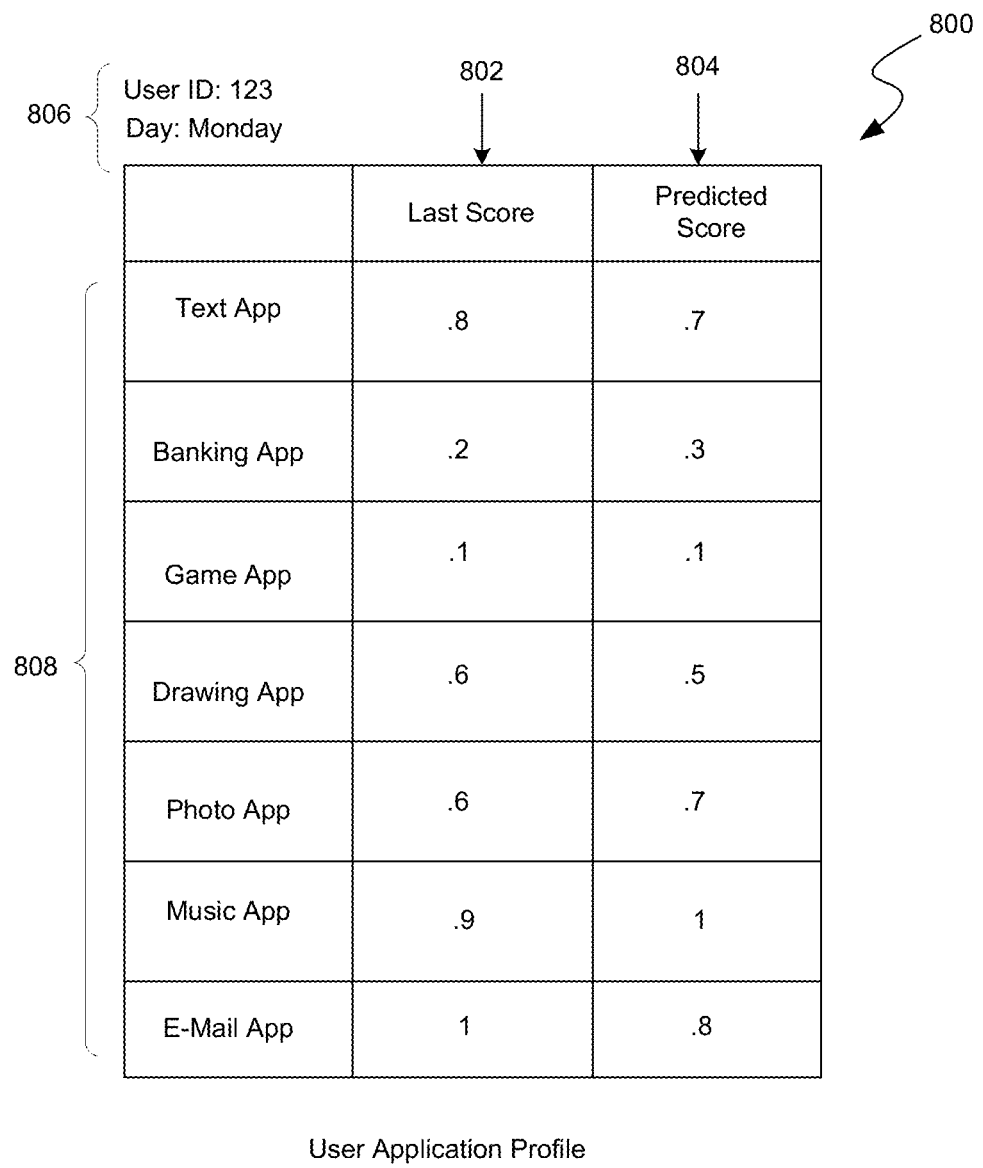
FIG. 8 illustrates an example user application profile generated by the computer system in FIG. 3.

FIGS. 8-9 illustrate profiles for a user application and a user category, respectively. FIG. 8 illustrates a profile for a user application on a selected day. FIG. 9 illustrates a profile for numerous applications, each falling within a predefined category, on a selected day.

Referring now to FIG. 8, a user application profile is illustrated. The profile 800 includes three columns including an identifier column 808, a last score column 802 and a predicted score column 804. Additionally, the profile can provide profile identification information 806, such as a user ID, and the time interval, such as the day, for which a user engagement score is being provided. Any number of user attributes utilized to generate the profile can be listed in the identification information. The profile 800 can also include any number of columns. For example, if the application has usage log data for the given day being analyzed, an additional column indicating a calculated score, or current score, can be included. In the embodiments provided in FIG. 8, the predicted score can reflect a score calculated with usage log data or predicted from a score decay model for a particular application.

The identifier column 808 can include a listing of each application installed on user 123's mobile device. In some embodiments, applications for which last engagement level scores or predicted scores equal zero are not listed. The identifier column 808 can list each application by name or other identifier known by the system. The last score column 802 reflects the last calculated engagement level score for that user in a corresponding application. For example, for application "Banking App," the last score of "0.2" reflects the last score calculated from recorded usage log data for "Banking App". In some embodiments, the last score can also reflect the last score calculated from a score decay model, e.g., a predicted score. For example, if the system generates a user application profile 808 and updates that profile when no new usage log data has been recorded for "Banking App," the last score 802 may reflect a previously predicted score 804. Accordingly, the predicted score 804 would reflect an updated predicted score 804 which may be lower due to no engagement activity and the downward slope on that applications' score decay model. In some embodiments, the updated predicted score 804 may reflect zero (0) engagement, which may cause or prompt the application to be removed from the user application profile 800 altogether.

As previously mentioned, the predicted score 804 column can reflect each of the user's applications which are installed on the user's mobile device and for which some engagement activity, e.g., events, has been recorded by the keypad application. The predicted score can reflect the engagement level score for the application on any given day within the time period over which the score decay model is generated. For example, the model may be generated for three (3) days, a week, or 3 weeks. The more distant the day for which an engagement level score is being predicted, the more variance may be seen between the last score and the predicted score.

FIG. 9 illustrates an application category profile 900, which provides similar data to the profile in FIG. 8. The category profile 900, however, provides a listing of the input values utilized to form the "Predicted Score" 904 of each category during a specified time interval, e.g., 1 day. The listing is provided in the "Category Values" 902 column. The category values can vary in number for each category 906 in the user category profile 900. The categories 906 can include categories assigned by the application developers, the application stores, third party application stores, or the user. The categories may include News, Sports, Social, Entertainment, Finance, Shopping, and Utility, among others. The category field of an application to which a category is assigned may then be utilized to search and compile the application usage logs to determine the category values 902 and the predicted score 904 for that category. In another embodiment, where the categories are user selected, a user may have multiple predefined "folders" on his or her mobile device, e.g., as defined by the mobile device manufacturer. The folder may be labeled by categories such as "sports", "entertainment", etc. and the user may then elect which applications apply to each of those category folders. In either of the aforementioned embodiments, the system can sum the categorized application score values and determine a mean score as a predicted value for a prescribed time interval. The predicted value can be additionally based on the average rate of engagement for that category, which can also be a mean rate for the applications within that category.

Additional columns may also be included in the user category profile 900, such as a listing of the applications within that category, the user ID, the time interval used to determine a predicted score, the average rate of engagement for a category, and/or any other additional applications specific information. The system can include predefined columns for the user category profile 900 in one embodiment. In another embodiment, a user of the system can elect which columns to include in the profile 900. The profile may additionally include a score decay graph for each category or other analytics calculated by the system based on the usage logs and application data.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims While certain aspects of the invention are presented below in certain claim forms, the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to add additional claims after filing the application to pursue such additional claim forms for other aspects of the invention.

We claim:

1. A computer-implemented method for assessing a user engagement level of a particular application used on a mobile device, the method comprising:
   a processor presenting a graphical keyboard or keypad on a display of the mobile device using a keypad application;
   detecting user input received on a mobile device via the keypad application that presented the graphical keyboard or keypad,
      wherein the keypad application is at least partially stored on the mobile device,
      wherein the keypad application is configured to receive user input data for input to multiple, different applications, including the particular application, and
      wherein the detected user input indicates that the keypad application is active during operation of the mobile device;
   the processor, in response to the user input being detected, at the mobile device, associating the user input with the particular application;
   at the mobile device, via the keypad application, logging data corresponding to user interaction with the particular application,
      wherein the user interaction includes data currently input by the user to the particular application via the graphical keyboard or keypad presented by the keypad application; and
   at the mobile device, via the keypad application, creating a usage log of the logged data,
      wherein the usage log includes at least an identifier for the user or the mobile device, an application identifier, and a timestamp; and
   determining a user engagement level for the particular application based on the logged data within the usage log.

2. The method of claim 1, further comprising:
   the processor maintaining the usage log on the mobile device;
   the processor aggregating multiple usage logs for the mobile device over a first interval; and
   the processor transmitting, through a network interface, the aggregated usage logs to a remote application engagement analysis system, wherein the analysis system calculates user engagement level scores.

3. The method of claim 1, wherein the application identifier identifies a category of the particular application or a folder in which the particular application is stored on the mobile device.

4. The method of claim 1, wherein determining user input includes selecting the application stored on the mobile device, wherein the application provides a user interface in which at least one user interaction is requested, and wherein the usage log includes a date of installation or date of removal of the particular application.

5. The method of claim 1, wherein multiple usage logs and corresponding engagement level scores for the particular application generate a decay model reflecting the user's engagement level with the particular application.

6. The method of claim 1, wherein the particular application is a website, and wherein the requested at least one user interaction includes a textual input.

7. The method of claim 1, wherein the user input includes a predetermined input that includes either one of: storing the application in a memory of the mobile device, or, removing the application from the storage of the mobile device.

* * * * *